United States Patent Office 3,039,997
Patented June 19, 1962

3,039,997
POLYMERS OF TRIAZINES, SULFAMIDES AND FORMALDEHYDE
Francis L. Scott, Elkins Park, Pa., and Herbert Q. Smith, Trenton, N.J., assignors to Pennsalt Chemicals Corporation, Philadelphia, Pa., a corporation of Pennsylvania
No Drawing. Filed Dec. 14, 1959, Ser. No. 859,094
18 Claims. (Cl. 260—67.6)

This invention relates to novel polymeric compositions and to a process for their preparation. In particular, this invention deals with polymers derived from certain polyamino-1,3,5-triazines, sulfamide and certain lower alkyl substituted sulfamides, and formaldehyde. The polymers of this invention are further characterized by their ability to form useful molded articles which are extremely resistant to water and organic solvents.

It is known in the prior art that sulfamide and formaldehyde will react to form polymers, but these polymers are in general either infusible powders, low-melting resins, or gum-like products. For example, reaction of one mole of sulfamide with 4 moles of formaldehyde at reflux with ammonia as catalyst gives a sticky resin; at pH 8.3 with a $KH_2PO_4$ buffer a similar result is obtained; with HCl as catalyst and with reaction at room temperature a hard, water-soluble resin is obtained (see J. Soc. Chem. Ind., 1933, p. 346 T). In like manner, reaction of sulfamide and formaldehyde at room temperature or at 50° C. in the presence of HCl gives an insoluble and infusible white powder (Angew. Chem., A60, 319 (1948)). No moldable resins of formaldehyde and sulfamide are known.

It is also known from information available in the Office of Technical Services Microfilm Report PB–25605, Frame 562 ff and 583 ff, that condensation products of sulfamide (or a substituted sulfamide having at least one available —NH— group), aldehydes, and a compound condensable with aldehydes are viscous liquids or solid low-melting resins, soluble in organic solvents, and useful as impregnants for porous materials.

It has now unexpectedly been found that solid, high-melting resins, insoluble in water and organic solvents, and capable of being molded by heat and pressure can be obtained by condensing formaldehyde under certain conditions with certain polyaminotriazines and sulfamides or its N- and N'-lower alkyl substitution products.

In accord with this invention, novel molding resins are obtained by reacting at a pH between 7.0 and about 10.0 (1) a polyamino-1,3,5-triazine of structure

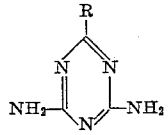

where R is a radical selected from the group of lower alkyl, aryl, and

radicals where R' and R" are selected from the group of hydrogen and lower alkyl radicals, (2) a sulfamide of structure $R_1$—NH—$SO_2$—NH—$R_1$, where the $R_1$ substituent is taken from the group of hydrogen and lower primary and secondary alkyl radicals containing from one to four carbon atoms, and (3) formaldehyde.

The process by which the novel polymers of this invention are made is quite simple and easily carried out. The condensation is accomplished by heating the reactants in an aqueous system at a pH between 7.0 and about 10.0. Preferably, the process will be conducted within the pH range of about 9.0 to 10.0 and this range is maintained by use of an alkali metal hydroxide. A combination of alkali metal hydroxide and ammonia may be used as is known in the art of formaldehyde condensations (see Experimental Plastics and Synthetic Resins, 1943, G. F. D'Alelio, John Wiley, 1942), and other alkaline and buffered alkaline systems may also be employed. The condensation is carried out at elevated temperatures (say 50° to 100° C.) and usually at reflux for one or several hours in order for completion of the reaction to occur in a practical time. When the condensation is carried out under acid conditions (i.e., at a pH below 7.0), polymers are obtained which either cannot be molded or which give molded products with poor physical properties. At pH values much above 10 the sulfamide undergoes rearrangement to an imidodisulfamide salt which interferes with the process.

It is not necessary that the triazine, sulfamide and formaldehyde be reacted simultaneously. A methyloltriazine may be first obtained and the sulfamide reactant then added. Alternately, the sulfamide and formaldehyde may be briefly reacted and then the triazine added, but this is not too desirable because of the great rapidity with which the sulfamide-formaldehyde polymer is formed. Preferably, the simultaneous reaction will be used, and where a methylol compound is first prepared it is preferred to add the sulfamide to the methyloltriazine.

The amounts of sulfamide, triazine and formaldehyde reactants that may be used will vary considerably. It is found that these novel moldable polymers are obtained when the proportion of sulfamide in the polymer is either high or low. That is, these polymers may have a high or low sulfamide to triazine molar ratio. Usually this molar ratio will be on the order of 1:1, but moldable polymers may be obtained with molar ratios of 1:10 and 10:1. The amount of formaldehyde employed will preferably be four moles per one mole of triazine, but more or less can, of course, be used and the amounts usually taken will vary from one to about forty moles per mole of triazine. The variation in the amount of formaldehyde taken will, of course, modify the nature of the end groups of the polymers, but it is found that the physical properties of the polymers obtained are not significantly affected.

The sulfamide and sulfamide derivatives useful in this invention are, as indicated, those of structure

$R_1$—NH—$SO_2$—NH—$R_1$ where $R_1$ is a member of the group selected from hydrogen and lower primary and secondary alkyl radicals containing from one to four carbon atoms. The term "primary and secondary alkyl radicals" refers to those alkyl radicals having a —$CH_2$— or >CH— group attached to the nitrogen atom of the sulfamide; i.e., the carbon atom of the alkyl radical attached to the nitrogen atom of the sulfamide will have at least one hydrogen atom on it. Tertiary alkyl radicals are not operable in this process, due, it is believed, to the steric hindrance effects they exhibit. The $R_1$ radicals may be the same or different and thus the parent sulfamide itself may be used as well as N-methylsulfamide, N,N'-dimethylsulfamide, N,N'-diisopropylsulfamide, N,N'-diisobutylsulfamide, N-methyl-N'-ethylsulfamide, N-ethylsulfamide, N,N'-di-sec-butylsulfamide, N,N'-di-n-propylsulfamide, N,N'-diethylsulfamide, N-methyl-N'-n-butylsulfamide, and the like.

The 1,3,5-triazines which may be used are, as indicated, those of structure

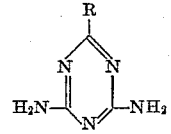

where R is selected from the group of lower alkyl, aryl, and

radicals where R' and R" are hydrogen or lower alkyl radicals. Thus when R is a lower alkyl radical such as methyl, ethyl, n-propyl, isopropyl, n-butyl, t-butyl and the like, the triazine will be a 2,4-diamino-6-alkyl-1,3,5-triazine. These compounds are described and reference to their preparation given in Table IV–B, page 244 of the monograph entitled "s-Triazines and Derivatives" by E. M. Smolin and L. Rapoport, Interscience Publishers Inc., New York, 1959. Likewise, Table IV–B–1 on page 246 of the same monograph describes those triazines where R is aryl; e.g., phenyl, m-tolyl, p-tolyl, α-naphthyl, β-naphthyl and the like. It will be understood that where R is phenyl, the 1,3,5-triazine is commonly referred to as benzoguanamine. Where the R radical is

and R' and R" are both hydrogen, the triazine is melamine. As indicated, however, R' and R" may also be the same or different lower alkyl groups in which case the 1,3,5-triazines useful to give the polymers of this invention are N-substituted melamines such as methylmelamine, ethylmelamine, N-isobutylmelamine, N,N-diethylmelamine, N,N-dibutylmelamine, and the like. These N-substituted melamines are disclosed and their preparation given on pages 360 to 364 of the above monograph. It is surprising that related 1,3,5-triazines such as ammeline (i.e., where R is OH) do not enter into the reaction, but when used result in a sulfamide-formaldehyde polymer together with unchanged ammeline.

The formaldehyde used may be obtained from any of the usual sources such as gaseous formaldehyde or aqueous solutions of the gas, trioxymethylene, paraformaldehyde, etc. It has been established that use of other aldehyde reagents (e.g., benzaldehyde and furfuraldehyde) do not result in the sulfamide-containing polymer.

The product polymers of this invention are white solids which decompose at temperatures between about 225° and 300° C. These polymers are extremely insoluble in water, alcohols (e.g., methanol, ethanol, etc.) aromatic hydrocarbons (e.g., benzene, toluene, xylene) and most of the common organic solvents. Some of these polymers, however, may show some slight solubility in boiling dimethylformamide and dimethylsulfoxide.

These polymers are valuable because of their ability to be molded into useful articles and such articles are particularly valuable where they are to be in constant or frequent contact with water or organic solvent materials. Thus, molded articles from the polymers of this invention are most valuable as pipes and linings, coating films, reaction vessels, etc. A surprising property of the polymers of this invention is that they are amorphous. This is in contrast to sulfamide-formaldehyde polymers which have a crystalline X-ray pattern.

The following examples will further illustrate the preparation, properties and value of these novel polymers.

EXAMPLE I (A) A mixture of 6.8 g. (83 mmol) of 37% formaldehyde, 2.0 g. (20.8 mmol) of sulfamide, 2.6 g. (20.8 mmol) of melamine, 1.6 ml. of 0.558 N sodium hydroxide, and 0.20 g. of 29% aqueous ammonia is refluxed for one hour. The pH of the solution is about 10.0. The white solid product that forms during the reaction (6.4 g.) is filtered off and this product is found to be a very hard resin. The resin is insoluble in water, ethanol, acetone, benzene and dimethylformamide. The solid decomposes at 250° to 260° C. and its analysis, based on the structural unit:

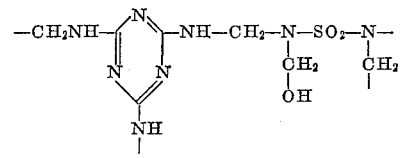

is as follows: $C_7H_{12}N_8SO_3$; calc./found=percent C, 29.1/28.2; percent H, 4.5/4.6; percent N, 38.8/39.8; percent S, 11.1/11.5.

The above polymer is placed in a Carver press and is subjected to pressure of 10,000 lbs. per square inch at 210° C. for one minute. Upon opening the press it is observed that a cohesive, translucent plaque has been formed.

(B) When the above experiment is repeated except that no melamine is used, a white solid product is obtained which decomposes at 232° to 240° C. This product is insoluble in water and ethanol, but soluble in hot dimethylformamide. When it is pressed at 210° C. at 10,000 lbs./in.², no plaque is obtained.

EXAMPLE II

Addition of Sulfamide to Methylolmelamine

A mixture of 6.2 g. (83 mmol) of 37% formaldehyde, 2.6 g. (20.8 mmol) of melamine, 1.6 ml. of 0.558 N NaOH, and 0.20 g. of 29% aqueous ammonia (pH about 10) is refluxed for one hour. To the slightly viscous solution is then added 2.0 (20.8 mmol) of sulfamide and the mixture is refluxed for an additional hour. The product (7.1 g.) is a hard, white solid (decomposes 246° to 260° C.) which is insoluble in water, ethanol, acetone and benzene. The solid is pressed into a cohesive, translucent plaque by the procedure of Example I.

EXAMPLE III

Mole Ratio of Triazine:Sulfamide=1.6

A mixture of 8.4 g. (104 mmol) of 37% formaldehyde, 5.0 g. (52 mmol) of sulfamide, 1.0 g. (8.3 mmol) of melamine, 1.45 ml. of 0.558 N sodium hydroxide, and 0.26 g. of 29% aqueous ammonia (pH about 10) is refluxed for one hour. The white, hard solid product (6.8 g.) decomposes at 222° to 230° C. and is insoluble in water, ethanol, acetone and benzene. It forms a plaque when it is pressed as described in Example I.

EXAMPLE IV

Mole Ratio of Triazine:Sulfamide=6:1

A mixture of 8.4 g. of 37% formaldehyde, 0.8 g. (8.3 mmol) of sulfamide, and 6.6 g. (52 mmol) of melamine is reacted as described in Example 1–A. The product (9.6 g.) is an insoluble white solid (decomposed at 290° C.) which is molded into a plaque by the technique of Example I.

EXAMPLE V

Reaction at pH 7.3

The procedure of Example 1–A is repeated except that the ammonia and sodium hydroxide are replaced with 8.0 g. of $KH_2PO_4$ buffer solution to maintain a pH of 7.3. The product (7.1 g.) is a very hard, white solid, insoluble in water, ethanol, acetone and benzene, decomposes at 256° to 270° C. and forms a cohesive plaque.

EXAMPLE VI

Reaction Under Acid Conditions

Example 1–A is repeated except that the ammonia and caustic are replaced with 1.5 ml. of concentrated hydrochloric acid and 6 ml. of water. The product (5.5 g.) is a water- and ethanol-insoluble white solid decomposing at 272° to 280° C. When it is pressed as described in Example I, the plaque that forms lacks cohesive strength.

EXAMPLE VII

Use of Benzoguanamine

Example 1-A is repeated except that the melamine is replaced with 3.9 g. (20.8 mmol) of benzoguanamine. The white product (7.2 g.) decomposes at 235° to 245° C. and is insoluble in water, ethanol, acetone and benzene. It forms a cohesive, translucent plaque.

When the above example is repeated without the sulfamide, a sticky gum is obtained which is soluble in cold water, ethanol, and dimethylformamide.

EXAMPLE VIII

Use of N,N'-Dimethylsulfamide

A mixture of 5.2 g. (64 mmol) of 37% formaldehyde, 2.09 (16 mmol) of N,N'-dimethylsulfamide, 2.0 g. (16 mmol) of melamine, 1.3 ml. of 0.558 N sodium hydroxide and 0.16 of 29% aqueous ammonia (pH about 10) is refluxed for one hour. The hard, white, solid product (5.7 g.) decomposes at 250° C. and is insoluble in water, ethanol, acetone and benzene. Elemental analysis is in agreement with the unit structure:

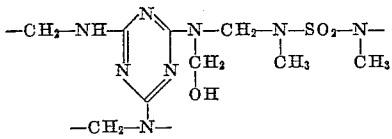

The polymer forms a cohesive, translucent plaque when it is pressed at 210° C. for one minute at 10,000 lbs./in.²

EXAMPLE IX

The melamine used in Example 1-A is replaced with a equimolar amount of 2,4-diamino-6-methyl-s-triazine (acetoguanamine) and reaction is carried out under the same conditions. The white product is insoluble in water, ethanol, and benzene, and forms a cohesive, translucent plaque.

EXAMPLE X

Example 1-A is repeated using ethylmelamine for melamine. The product obtained is a white solid insoluble in water, ethanol, and benzene, and forms a cohesive plaque.

EXAMPLE XI

N,N-dimethylmelamine is used instead of melamine in Example 1-A and a polymer with essentially the same insolubility and moldability is obtained.

It will be apparent to those skilled in the art that numerous variations may be made from the above description of this invention. Accordingly, it is to be understood that the scope of this invention is not to be limited by the specific embodiments set out above.

We claim:

1. An amorphous moldable polymer obtained by condensing at a pH between 7 and about 10 formaldehyde, a 1,3,5-triazine of structure

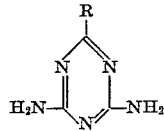

where R is a radical selected from the group consisting of lower alkyl, aryl, and

radicals wherein R' and R" are selected from the group of hydrogen and lower alkyl radicals, and a sulfamide of structure R₁—NH—SO₂—NH—R₁ where R₁ is a member of the group consisting of H, lower primary alkyl radicals and lower secondary alkyl radicals.

2. An amorphous moldable polymer according to claim 1 consisting of formaldehyde, melamine and sulfamide.

3. An amorphous moldable polymer according to claim 1 consisting of formaldehyde, benzoguanamine and sulfamide.

4. An amorphous moldable polymer according to claim 1 consisting of formaldehyde, melamine and N,N'-dimethylsulfamide.

5. An amorphous moldable polymer according to claim 1 consisting of formaldehyde, sulfamide and acetoguanamine.

6. An amorphous moldable polymer according to claim 1 consisting of formaldehyde, sulfamide and ethylmelamine.

7. A process for preparing an amorphous moldable polymer which comprises reacting formaldehyde, a 1,3,5-triazine of structure

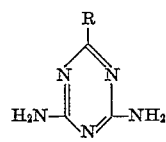

where R is a member of the group consisting of lower alkyl, aryl and

radicals wherein R' and R" are selected from the group of hydrogen and lower alkyl radicals, and a sulfamide of structure R₁—NH—SO₂—NH—R₁ where R₁ is a member of the group consisting of H, lower primary alkyl radicals, and lower secondary alkyl radicals, said reaction being carried out in an aqueous medium and at a pH between 7.0 and about 10.0.

8. A process for preparing an amorphous moldable polymer which comprises reacting in an aqueous system and at a pH between 7.0 and about 10.0 formaldehyde, a 1,3,5-triazine of structure

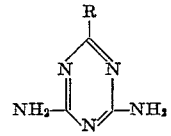

where R is a member of the group selected from lower alkyl, aryl and

radicals wherein R' and R" are selected from the group of hydrogen and lower alkyl radicals, and a sulfamide of structure R₁—NH—SO₂—NH—R₁ where R₁ is a member of the group consisting of H, lower primary alkyl radicals, and lower secondary alkyl radicals, the molar ratio of said triazine to said sulfamide being between 1:10 and 10:1.

9. The process of claim 8 in which the molar ratio of triazine to sulfamide is 1:1:

10. The process of claim 8 in which the molar ratio of triazine to sulfamide is 1:6.

11. The process of claim 8 in which the molar ratio of triazine to sulfamide is 6:1.

12. An amorphous moldable polymer obtained by condensing at a pH between 7 and about 10 formaldehyde, melamine and sulfamide, said melamine and sulfamide components being present in said polymer in a mole ratio between 1:10 and 10:1.

13. The polymer of claim 12 in which the mole ratio of melamine to sulfamide is 1:1:

14. The polymer of claim 12 in which the mole ratio of melamine to sulfamide is 1:6.

15. The polymer of claim 12 in which the mole ratio of melamine to sulfamide is 6:1.

16. The polymer of claim 3 in which the mole ratio of benzoquanamine to sulfamide is 1:1.

17. The polymer of claim 3 in which the mole ratio of benzoquanamine to sulfamide is 1:6.

18. The polymer of claim 3 in which the mole ratio of benzoquanamine to sulfamide is 6:1.

References Cited in the file of this patent

UNITED STATES PATENTS

| | | |
|---|---|---|
| 2,366,494 | D'Alelio | Jan. 2, 1945 |
| 2,369,439 | Cupery | Feb. 13, 1945 |
| 2,389,416 | D'Alelio | Nov. 20, 1945 |

FOREIGN PATENTS

| | | |
|---|---|---|
| 561,232 | Great Britain | May 11, 1944 |
| 823,925 | France | Jan. 28, 1938 |

OTHER REFERENCES

Wood et al.: Journal of the Society of Chemical Industry, 1933 (London), pages 346–349T.

UNITED STATES PATENT OFFICE

CERTIFICATE OF CORRECTION

Patent No. 3,039,997　　　　　　　　　　　　June 19, 1962

Francis L. Scott et al.

It is hereby certified that error appears in the above numbered patent requiring correction and that the said Letters Patent should read as corrected below.

Column 3, line 50, after "organic" strike out the comma; column 4, line 27, for "6.2" read -- 6.8 --; column 7, lines 4, 6, and 8, for "benzoquanamine", each occurrence, read -- benzoguanamine --.

Signed and sealed this 2nd day of October 1962

(SEAL)
Attest:

ERNEST W. SWIDER
Attesting Officer

DAVID L. LADD
Commissioner of Patents